(12) United States Patent
Zerfass et al.

(10) Patent No.: US 7,086,651 B2
(45) Date of Patent: Aug. 8, 2006

(54) METHOD FOR APPLYING A PROJECTION TO A METAL LAYER OF A CYLINDER-HEAD GASKET, AND CYLINDER-HEAD GASKET

(75) Inventors: Hans-Rainer Zerfass, Taunusstein (DE); Viktor Winkovic, Idstein (DE)

(73) Assignee: ElringKlinger AG, Dettingen (DE)

(*) Notice: Subject to any disclaimer, the term of this patent is extended or adjusted under 35 U.S.C. 154(b) by 190 days.

(21) Appl. No.: 10/769,045

(22) Filed: Jan. 30, 2004

(65) Prior Publication Data

US 2004/0183259 A1 Sep. 23, 2004

Related U.S. Application Data

(62) Division of application No. 09/838,965, filed on Apr. 20, 2001, now Pat. No. 6,708,982.

(30) Foreign Application Priority Data

Apr. 20, 2000 (DE) .......................... 100 19 715

(51) Int. Cl.
F02F 11/00 (2006.01)

(52) U.S. Cl. .................... 277/592; 277/593; 277/596
(58) Field of Classification Search .......... 277/591–597
See application file for complete search history.

(56) References Cited

U.S. PATENT DOCUMENTS

| 5,888,638 A | 3/1999 | Kleinhans |
| 6,173,966 B1 * | 1/2001 | Noble et al. ............. 277/596 |
| 6,202,877 B1 * | 3/2001 | La Torre et al. ......... 220/254.1 |
| 6,349,945 B1 * | 2/2002 | Schmucker et al. ........ 277/592 |
| 6,354,559 B1 * | 3/2002 | Eisentraut .................. 248/638 |
| 6,708,892 B1 * | 3/2004 | Smith, II .................... 235/492 |

FOREIGN PATENT DOCUMENTS

| DE | 34 23 286 C1 | 1/1986 |
| DE | 37 19 484 A1 | 12/1988 |
| DE | 39 30 120 A | 3/1991 |
| DE | 196 05 871 C2 | 8/1997 |
| DE | 196 11 092 A1 | 9/1997 |
| EP | 0 510 666 A | 10/1992 |
| EP | 0 867 645 A | 9/1998 |

OTHER PUBLICATIONS

Hoffman; Werner: Kautschuk–Technologie; Stuttgart; Gentner Verlag; 1980; p. 171; ISBN 3 87247 262 3; in German.

* cited by examiner

*Primary Examiner*—Enoch Peavey
(74) *Attorney, Agent, or Firm*—Alix, Yale & Ristas, LLP

(57) ABSTRACT

The invention relates to the application of a projection to a metal layer of a metallic cylinder-head gasket for an internal-combustion engine having at least one elastic metal sheet, which is provided with one opening or a plurality of adjacent openings depending on the number of combustion chambers of the internal-combustion engine, a bead being provided in the at least one elastic metal sheet around each opening, at a distance from the latter, so that a straight section of sheet metal is left clear in the region of the edge of the opening, for which bead a spring travel limiter or stopper, which runs coaxially with respect to the bead and is formed by the projection, is provided, the projection being produced from a mixture which contains a plastic with a high mineral filler content. A mixture of an elastomer in particular with a filler which has been surface-treated by means of a silane is used.

8 Claims, 1 Drawing Sheet

METHOD FOR APPLYING A PROJECTION TO A METAL LAYER OF A CYLINDER-HEAD GASKET, AND CYLINDER-HEAD GASKET

CROSS REFERENCE TO RELATED APPLICATIONS

This application is a Divisional application of U.S. Application Ser. No. 09/838,965, filed Apr. 20, 2001, which claims the benefit of German Application No. 10019715.9, filed Apr. 20, 2000, the contents of each of which are incorporated herein by reference in their entirety.

FIELD OF THE INVENTION

The invention relates to a method for applying a projection to a metal layer of a cylinder-head gasket as it is used in an internal combustion engine and to a cylinder-head gasket.

BACKGROUND OF THE INVENTION

It is known from published German Patent Application 196 11 092 to apply a projection to a metal layer of a metallic cylinder-head gasket for an internal-combustion engine having at least one functional metal sheet, which is provided with one opening or a plurality of adjacent openings depending on the number of combustion chambers of the internal-combustion engine, a bead being provided in the at least one elastic metal sheet around each opening, at a distance from the latter, so that a straight section of sheet metal is left clear in the region of the edge of the opening, for which bead a spring travel limiter or so-called stopper, which runs coaxially with respect to the bead and is formed by the projection, is provided, the projection consisting of a sufficiently temperature-resistant thermosetting plastic with a high mineral filler content. A spring travel limiter or so-called stopper of this type has to fulfil the requirement that it must not be deformed under the compressive and thermal loads at the edge of the combustion chamber, i.e. must be virtually inelastic. However, suitable thermosetting plastics then have the drawback of being brittle, with the result that the spring travel limiter which is formed by the projection may break during handling and installation.

SUMMARY OF THE INVENTION

It is an object of the invention to provide a method used during the production of cylinder-head gaskets, which process allows forming plastic stoppers, which are designed as projections, in such a way that they are substantially inelastic under the compressive and thermal loads to which they are exposed in an internal-combustion engine.

It is a further object of the invention to provide a method to form a stopper which does not break during handling and installation.

Still a further object of the present invention is to provide a cylinder-head gasket having one or more stoppers of plastic material which are substantially inelastic under the compressive and thermal loads to which they are exposed in an internal-combustion engine.

In one aspect, the invention is thus a method for applying a projection to a metal layer of a metallic cylinder-head gasket for an internal-combustion engine having at least one elastic metal sheet, which is provided with at least one opening depending on the number of combustion chambers of the internal-combustion engine. A bead is provided in the at least one elastic metal sheet around each opening, at a distance from the later, so that a straight section of sheet metal is left clear in the region of the edge of the opening, for which bead a stopper, which runs coaxially with respect to the bead and is formed by the projection, is provided. The projection is produced from a mixture which contains a plastic with a high mineral filler content, especially a mixture of an elastomer with a filler which has been surface-treated by means of a silane.

A further aspect of the invention is a metallic cylinder-head gasket for an internal-combustion engine having at least one elastic metal sheet which is provided with at least one opening depending on the number of combustion chambers in the internal-combustion engine, a bead being provided in the at least one elastic metal sheet, around each opening at a distance from the later, so that a straight section of metal sheet is left clear in the region of the edge of the opening, for which bead a stopper, which runs coaxially with respect to the bead, is provided. The at least one projection consists of a plastic with a high mineral filler content, especially an elastomer with a filler which has been surface-treated with a silane.

The use of fillers which have been surface-treated with a silane, for example, an aminosilane or an epoxysilane, to produce an elastomer with a high filler content, from which stopper-like projections are formed on one or more metal layers of a single-layer or multilayer metallic cylinder-head gasket, for example, by screen printing or the automatic application of a bead, surprisingly results in projections or stoppers which satisfy both contradictory requirements. Moreover, the result is a very simple, inexpensive process for forming the projections which readily makes it possible to employ both layers of a uniform thickness and width and layers which vary in thickness and width, by suitably designing a screen which is used for the screen printing.

The compressive strength of the elastomer is provided by suitable filling with the surface-treated filler. In this case, a plastic/filler ratio of 1:1 to 1:5, in particular 1:2.5 to 1:4, is expedient. The filler used is preferably a filler which has a low coefficient of thermal expansion, for example, silica flour (particularly preferred), aluminum oxide, rutile, dolomite or wollastonite.

Particularly, suitable elastomers are fluororubber or fluorosilicone rubber. Typical solvent-containing formulations may be made up as follows:

| | |
|---|---|
| Fluororubber Solution In Methoxybutyl Acetate (36% Strength) | 50.0 Parts By Weight |
| Silica Flour (Coated With Epoxysilane) | 38.0 Parts By Weight |
| Flow Control Agent | 0.15 Part By Weight |
| Crosslinker | 0.15 Part By Weight |
| Adhesion Promoter DAMO Silane | 0.50 Part By Weight |

Surprisingly, it has been found that cylinder-head gaskets with projections with a composition of this nature withstand the loads which are imposed when used in engines.

Further embodiments of the invention may be taken from the following description and the claims.

BRIEF DESCRIPTION OF THE DRAWINGS

The invention is explained in more detail below with reference to exemplary embodiments which are illustrated in the appended figures.

DETAILED DESCRIPTION OF PREFERRED EMBODIMENTS

Figure 1:
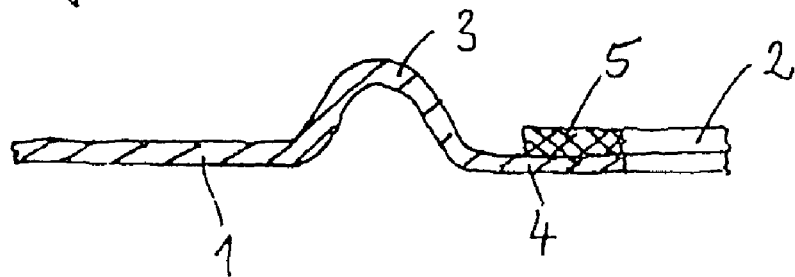
FIGS. 1 to 4 show diagrammatic, partial sections through various embodiments of cylinder-head gaskets.

The cylinder-head gasket illustrated in FIG. 1 comprises a functional elastic metal sheet 1 which is provided with one or more openings 2 depending on the number of combustion chambers in the associated internal-combustion engine and bolt passage holes (not shown) for cylinder-head bolts, and usually with passage openings (likewise not shown) for cooling water or oil.

The elastic metal sheet 1, which is usually made from spring steel and is otherwise planar, is provided with beads 3 which are arranged at a distance from the edge region of the corresponding opening 2, so that a straight section 4 of metal sheet is left clear.

A stopper 5, which simultaneously serves to increase the thickness of the cylinder-head gasket on the combustion chamber side, is made from elastomer, and is applied, for example by the screen-printing process, next to the edge of the combustion chamber, in order to protect the bead 3 from excessive mechanical deformation, on that side of the elastic metal sheet 1 on which the convexity of the bead 3 is formed.

Figure 2:
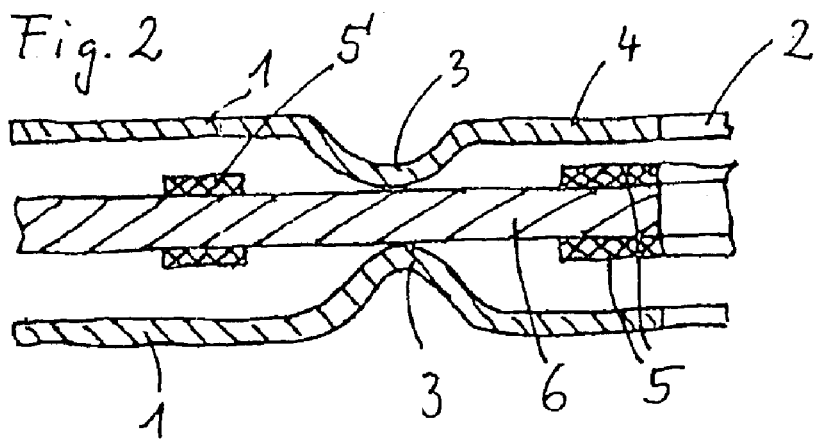

In the embodiment illustrated in FIG. 2, two functional metals sheets 1 are provided as covering sheets, with their beads 3 arranged mirror-symmetrically with respect to one another and facing towards one another, a planar metal support sheet 6 being arranged between the elastic metal sheets 1. Next to the corresponding combustion-chamber edge, the metal support sheet 6 is provided on both sides with a stopper 5 made from elastomer, in order to protect the two beads 3 of the two functional metal layers and to produce the projection on the combustion chamber side, i.e. to limit the spring travel of the beads 3. The stoppers 5 are in this case arranged symmetrically with respect to the center plane or plane of symmetry of the cylinder-head gasket.

In addition, it is also possible for additional stoppers 5' to be provided radially outside the corresponding bead 3, which stoppers 5' likewise consist of elastomer and are applied using the screen-printing process at the same time as the radially inner stoppers 5.

As an alternative to the stoppers 5 being applied to the metal support sheet 6, it is also possible to use two functional metal sheets 1 with stoppers 5 as shown in FIG. 1.

One of the elastic metal sheets 1 and the associated stoppers 5, 5' may also be absent in the embodiment shown in FIG. 2.

Figure 3:
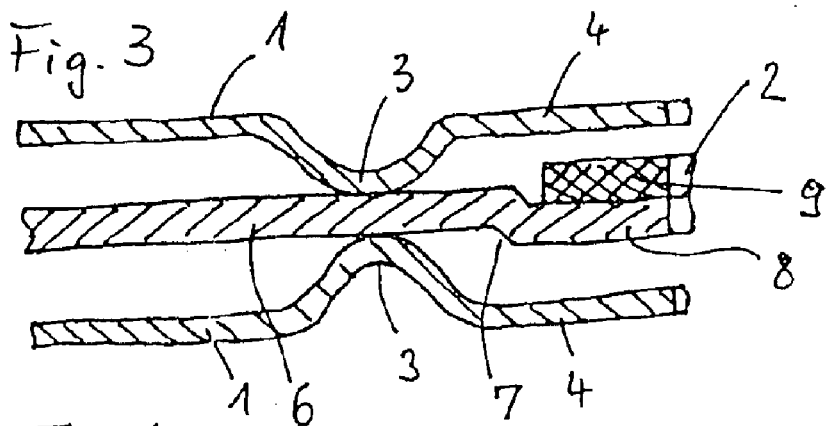

As shown in FIG. 3, the metal support sheet 6 may in each case be provided with an offset shoulder 7 which runs around the corresponding opening 2 and in the region of which an annular application of elastomer 9, which is produced by the screen-printing process, is applied in such a way that the offset region 8 of the metal support sheet 6 and the application of elastomer 9 are preferably arranged substantially centrally between the two functional metal sheets 1. In this case, the stopper is formed by the application of elastomer 9 and the offset region 8 of the metal support sheet 6.

Figure 4:
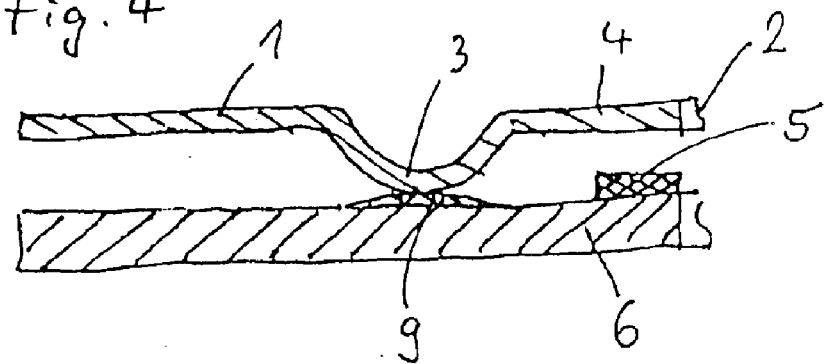

In addition, it is provided in the embodiment illustrated in FIG. 4, which in this case is of two-layer design, for the region where the bead 3 rests on the metal support sheet 6 to be changed in the circumferential direction, for which purpose a projection in the form of an application of elastomer applied by screen printing is provided on the metal support sheet 6, with a thickness which varies in the circumferential direction, in the bearing region of the bead 3.

As already pointed out, the compressive strength of the elastomer is provided by suitable filling with the surface-treated filler. In this case, a plastic/filler ratio of 1:1 to 1:5, in particular 1:2.5 to 1:4, is expedient. The filler used is preferably a filler which has a low coefficient of thermal expansion, for example silica flour (particularly preferred), aluminum oxide, rutile, dolomite or wollastonite. Especially, a formulation as mentioned in the above table may be used.

While the invention has been shown and described with reference to preferred embodiments, it should be apparent to one ordinary skilled in the art that many changes and modifications may be made without departing from the spirit and scope of the invention as defined in the claims.

What is claimed:

1. A metallic cylinder-head gasket for an internal-combustion engine, the gasket comprising at least one elastic metal sheet including:

at least one opening depending on the number of combustion chambers in the internal-combustion engine;

a bead in the at least one elastic metal sheet, around each opening at a distance from the opening, so that a straight section of metal sheet is left adjacent the edge of the opening; and a stopper projection associated with the bead;

wherein the stopper projection comprises an elastomeric plastic with a high mineral filler content which has been surface-treated with a silane.

2. The cylinder-head gasket according to claim 1, wherein the elastomer is one of the group consisting of a fluororubber and fluorosilicone rubber.

3. The cylinder-head gasket according to claim 1, wherein the mixture has a plastic/filler ratio from 1:1 to 1:5.

4. The cylinder-head gasket according to claim 1, wherein the filler is silica flour.

5. The cylinder-head gasket according to claim 4, wherein the mass of silica flour is present in range of about 10 to 100% of the mass of the plastic.

6. The cylinder-head gasket according to claim 1, wherein the silane is one of the group consisting of an epoxysilane and an aminosilane.

7. The cylinder-head gasket according to claim 1, wherein the stopper projection is on said straight section of the metal sheet.

8. The cylinder-head gasket according to claim 1, wherein the stopper projection is in the form of a bead.

* * * * *